Dec. 12, 1933.  C. A. STYER  1,939,088
PHOTOSENSITIVE APPARATUS
Filed July 30, 1930   2 Sheets-Sheet 1

INVENTOR
Charles A. Styer
BY
ATTORNEY

Dec. 12, 1933.   C. A. STYER   1,939,088
PHOTOSENSITIVE APPARATUS
Filed July 30, 1930   2 Sheets-Sheet 2
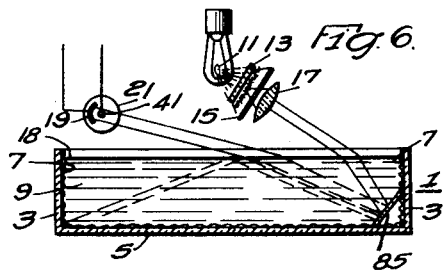
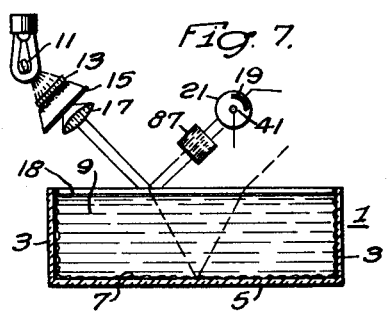
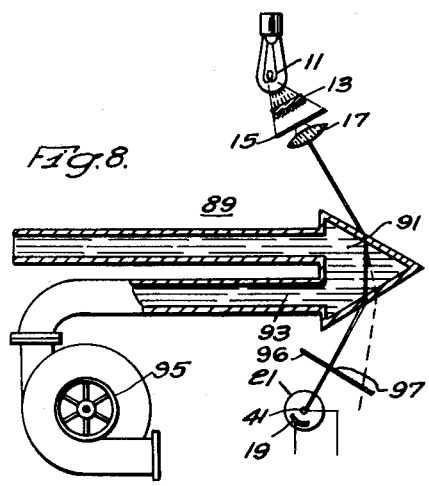
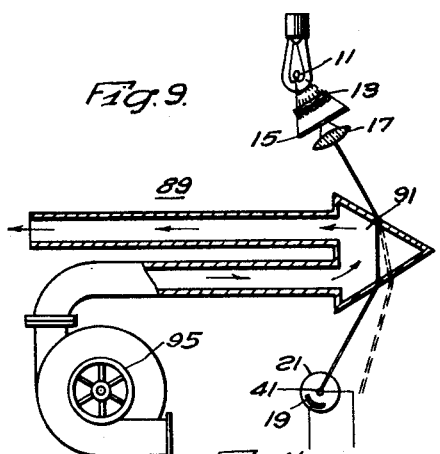
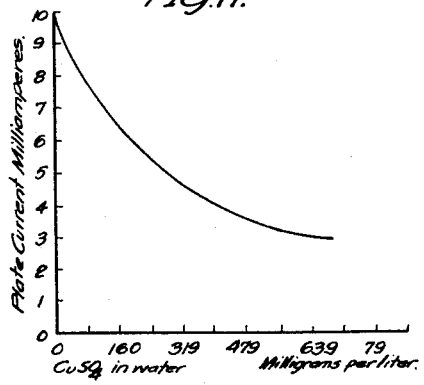
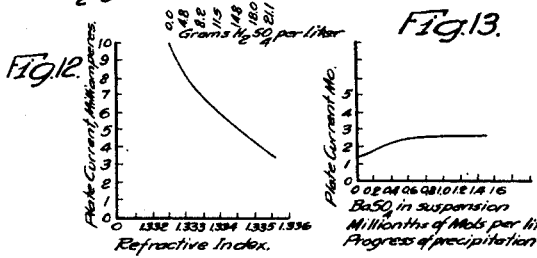
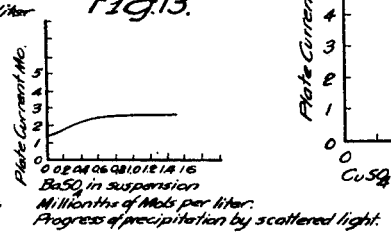
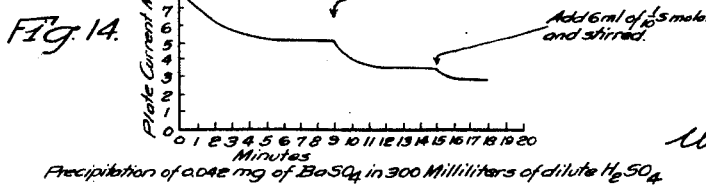
INVENTOR
Charles A. Styer.
BY
Wesley G. Carr
ATTORNEY Patented Dec. 12, 1933

1,939,088

UNITED STATES PATENT OFFICE 1,939,088

PHOTOSENSITIVE APPARATUS

Charles A. Styer, Forest Hills, Pa., assignor to Westinghouse Electric & Manufacturing Company, a corporation of Pennsylvania Application July 30, 1930. Serial No. 471,872

1 Claim. (Cl. 88—14)

My invention relates to photo-sensitive apparatus and has particular relation to apparatus used in detecting changes in the properties of fluids.

In photo-sensitive testing apparatus of this nature, constructed and operated according to the teachings of the prior art, of which I am aware, the only characteristic of fluids that is used is their tendency to absorb light of a particular range of wave lengths. It is apparent that indicating apparatus, wherein only the absorption power of a fluid, and characteristics related thereto, are used as criteria for indicating the difference in its physical and chemical properties, is considerably limited in its range of applicability.

A considerable number of optical characteristics of a fluid are considerably more sensitive to its chemical and physical condition than are its color and its transmissibility. Such characteristics are the reflecting power, scattering power, refractive index, polarizing power and dispersing power.

It is, accordingly, an object of my invention to provide apparatus for indicating the condition of fluids wherein the optical characteristics of the fluids are utilized for indicating such condition.

A more specific object of my invention is to provide apparatus for observing the condition of a fluid wherein the reflecting power of the fluid is utilized for indicating the condition thereof.

Another specific object of my invention is to provide apparatus wherein the index of refraction of a fluid is utilized for indicating its instantaneous physical and chemical conditions.

An additional specific object of my invention is to provide photo-sensitive apparatus wherein the dispersive power of a fluid is utilized as a criterion of its physical and chemical conditions.

A further specific object of my invention is to provide testing apparatus wherein the polarizing power of a fluid is utilized as an indication of its chemical content and of its physical condition.

A still further specific object of my invention is to provide photo-sensitive apparatus for analyzing a fluid by observing the scattering power of the fluid.

Another and more general object of my invention is to provide analyzing apparatus wherein a combination of the optical properties of fluids are utilized for indicating their instantaneous physical and chemical states.

An ancillary object of my invention is to provide apparatus for signalling that a certain property of a fluid has attained a predetermined condition.

More concisely stated, it is an object of my invention to provide photo-sensitive indicating apparatus for detecting variations in the physical and chemical properties of fluids by observing the optical changes in the fluids introduced by the changes in the physical and chemical properties.

According to my invention, I provide photosensitive means responsive to radiant energy that has been modified by fluid under test.

In a more specific modification of my invention, the photo-sensitive apparatus is so disposed, relative to the fluid and to the source of radiant energy, that it responds to radiations reflected or scattered from the fluid.

In another specific modification of my invention, the photo-sensitive device responds to radiant energy refracted by the test fluid, while, in other modifications of my invention, the radiant energy is dispersed or is polarized by the fluid that is under test.

In further modifications of my invention, the radiant energy is modified by a combination of the optical characteristics of the fluid that is under investigation.

The novel features that I consider characteristic of my invention are set forth with particularity in the appended claim. The invention itself, however, both as to its organization and its method of operation, together with additional objects and advantages thereof, will best be understood from the following description of specific embodiments, when read in connection with the accompanying drawings, in which:

Figure 1 is a schematic view showing an embodiment of my invention wherein radiant energy is reflected from the surface of a test fluid into a photo-sensitive device, Fig. 2 is a schematic view of a modification of my invention wherein the radiant energy is refracted, Fig. 3 is a schematic view showing a modification of my invention wherein the property of total reflection is utilized, Fig. 4 is a schematic view of another modification of my invention wherein the property of total reflection is utilized.

Fig. 5 is a schematic view showing a modification of my invention wherein a signalling means is provided for abruptly indicating that the fluid under test has reached a predetermined condition, Fig. 6 is a schematic view showing another modification of my invention that may be utilized for abruptly indicating that the property of a fluid has attained a predetermined condition or for the study of its gradual variation.

Fig. 7 is a schematic view showing a modification of my invention wherein the polarizing-by-reflection characteristic of a fluid is utilized for indicating its physical and its chemical conditions.

Fig. 8 is a schematic view showing a modification of my invention wherein the dispersing power of a fluid is utilized as a criterion of its condition.

Fig. 9 is a schematic view showing a modification of my invention specifically applicable to testing the properties of a gas.

Fig. 10 is a table illustrating the extent to which the sensitivity of my invention has been realized in practice.

Figs. 11, 12, 13 and 14 are a series of curves obtained by making certain measurements with apparatus constructed according to my invention.

Figure 1:
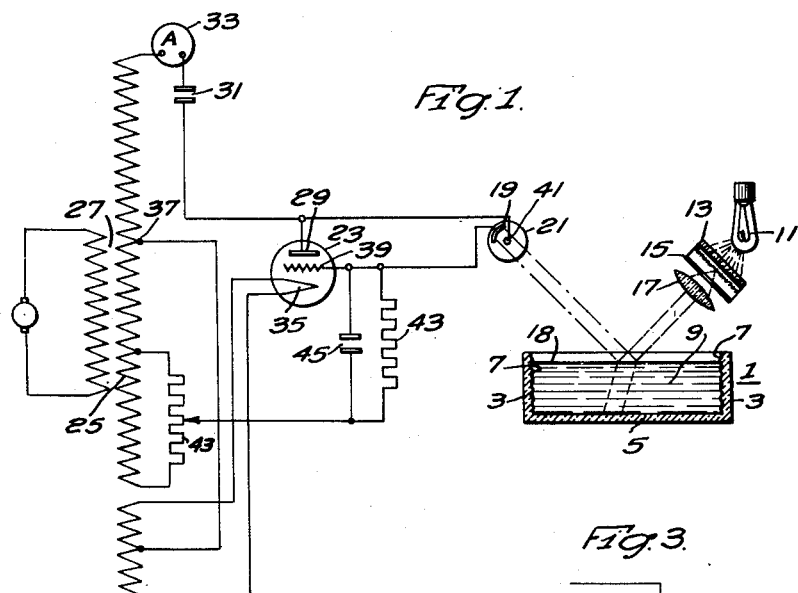

The apparatus shown in Fig. 1 comprises a container 1 having its walls 3 and its base 5 coated with a light-absorbing layer 7 and having a fluid that is under investigation disposed therein. Light from a source 11, situated adjacent to the container 1, is diffused by a ground-glass screen 13, limited by a mask 15, collimated by a lens 17 and reflected from the surface 18 of the fluid 9 to the cathode 19 of a photo-sensitive cell 21.

The fraction of the incident light that is reflected from the surface of the fluid 9 is dependent upon the condition of the fluid. The photo-cell 21 responds to the light that impinges on its cathode, i. e. to light modified by the fluid.

The response of the photo-cell 21 is not directly measured but the photo-cell current is amplified by suitable amplifying apparatus. I have found an amplifying device disclosed in a copending application of Edwin H. Vedder, Serial No. 433,492, filed March 5, 1930, and assigned to Westinghouse Electric and Manufacturing Company to be particularly useful in this connection.

Specifically, the system comprises an electron-discharge tube 23 operated from the secondary 25 of a power-transmission transformer 27, the anode 29 of which is connected to one terminal of the secondary 25 through a condenser 31 and an indicating device 33, and the cathode 35 of which is connected at the potential of an intermediate point 37, of the secondary 25. The control electrode 39 of the tube 23 is connected directly to the cathode 19 of the photo-cell 21, while the anode 41 of the photo-cell is connected to the anode 29 of the tube 23. The grid 39 of the tube 23 is also connected to a terminal of the secondary 25 through a resistance 43.

Other impedances 43 and 45 are supplied in the circuit for regulating the characteristics of its output. The meter 33, in the plate circuit of the tube, gives an indication of the magnitude of the light reflected from the fluid 9 and, consequently, indicates the condition of the physical property of the liquid that is being observed through its reflecting power.

The apparatus of the type shown in Fig. 2 comprises a container 47 essentially similar to the container 1 of the equipment of the type discussed hereinabove. However, in addition to the elements of the aforementioned container 1, the present receptacle embodies a specular layer 49 on its bottom surface 5 that replaces the light absorbing layer 7 of the aforementioned container 1.

Light, diffused, masked and collimated by an optical system similar to the optical system of the above-discussed apparatus, is transmitted through the liquid to the specular surface 49 of the container 47. From the mirror surface, it is reflected through the fluid 9 and emerges from the fluid through the same surface through which it entered. The light emerging from the fluid is restricted by a mask 51 and impinges on a photo-electric cell 21 connected in a circuit analogous to the amplifying circuit of the aforementioned apparatus.

Figure 2:
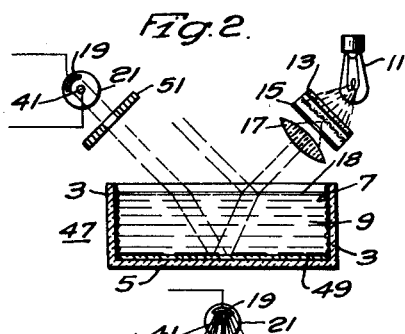

It is to be noted that the apparatus illustrated in Fig. 2 is capable of yielding a wider variation in the photo-electric effect for a given variation in the properties of the fluid than the apparatus illustrated in Fig. 1 since, in the latter system, the light is modified, both by refraction and by reflection, from the surfaces through which it passes. It is, furthermore, to be noted that, with slight modifications, both systems may be applied to the observation of the optical results of the scattering power of the fluid 9.

Figure 3:
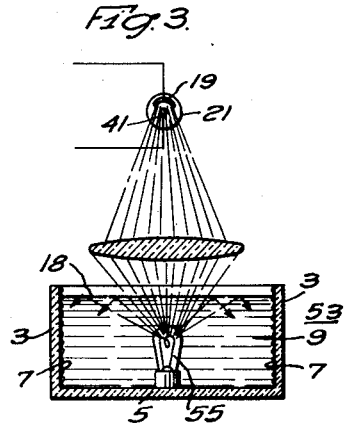
Figure 4:
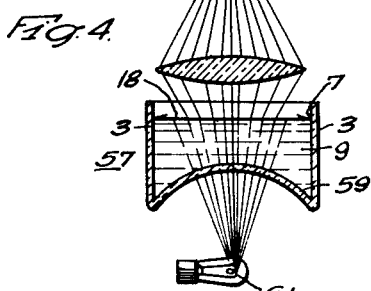

Apparatus of the type shown in Figs. 3 and 4 is essentially similar, in its principle of operation, to the above mentioned equipment. The former system comprises a container 53, essentially similar to the container of the apparatus shown in Fig. 1, having a source of illumination 55 centrally disposed therein. The light from the source 55 is partly transmitted through the fluid 9 and converged on the cathode 19 of the photo-electric cell and partly or totally reflected by the fluid 9. Since the angle at which total reflection begins is dependent on the index of refraction of the fluid, the device shown in the drawings offers a convenient method for studying the properties of a fluid by observing variations in its index of refraction. As the refractive index of the fluid changes, the solid angle of light emitted is varied, and, consequently, the state of excitation of the photo-cell is varied.

Apparatus of the type shown in Fig. 4 is similar in nature to the apparatus illustrated in Fig. 3 and is particularly applicable to equipment wherein it is not possible to locate the illuminating source within the fluid. The container 57 of the fluid is equipped with a base 59 having a surface of cylindrical or spherical curvature, and the source of illumination 61 is adjustably situated substantially at the center of curvature of the base 59. However, it is also within the scope of my invention to dispose the source 61 at any advantageous position relative to the base 59, and, furthermore, to give the base any desirable curvature.

The apparatus that has just been described may, with facility, be applied to detecting variations in the light-scattering by the fluid.

Figure 5:
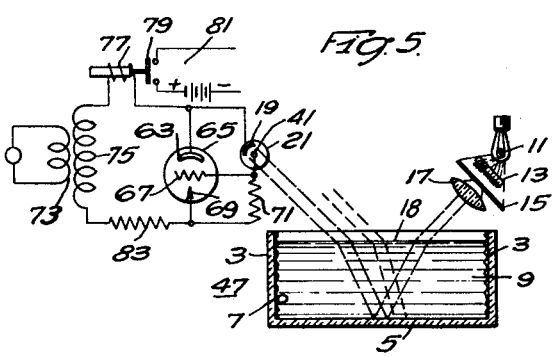

Apparatus of the type shown in Fig. 5 is specifically adapted to the abrupt detection of a predetermined condition in a fluid. The container and the optical system of this type of apparatus are essentially similar to the container 47 and the optical system of the apparatus shown in Fig. 2, the only exception being that the mask 51 between the photo-electric cell 21 and the surface 18 of the fluid 9 is omitted.

In this system, the cathode 19 of a photo-electric cell 21 is directly connected to the cathode 63 of a grid-glow tube 65. The anode 41 is connected to the control electrode 67 of the tube 65 directly and to the anode 69 of the tube 65 through an impedance 71.

Power is supplied to the tube through a transformer 73, the secondary 75 of which has one terminal connected to the cathodes 63 and 19 of the tube 65 and the cell 21, respectively, through the exciting coil 77 of a contactor 79 that is adapted to close a signalling circuit 81 when the contactor coil 77 is deenergized. The remaining terminal of the secondary 75 is connected to the anode 69 of the tube 65 through a limiting impedance 83.

When the fluid in the container 47 attains a predetermined state, maximum light impinges on the cathode 19 of the photo-cell 21, and the impedance thereof is decreased to such an extent that the normal flow of current through the tube 65 is interrupted. The contactor 79 is then actuated to close the signalling circuit 81.

Apparatus of the type shown in Fig. 6 is a sub-modification of the apparatus shown in Figs. 2, 3, 4 and 5. The apparatus may be adapted to be used for abrupt signalling of a certain condition or it may be adapted to the measurement of a gradually varying condition.

Preferably, the elements utilized in the apparatus of Fig. 1 are utilized in the present system. However, the optical elements are rearranged relative to the container, and a mirror 85 is disposed in the container at such angle to the incident beam that the light reflected therefrom is capable of being totally reflected from the surface of the fluid for small variations in the refractive index of the fluid. It is to be noted that the effect of a variation in the index of refraction in this case, is multiplied.

In the drawings, the full line shows the path of a ray for a certain index of refraction, and the broken line shows the path of a ray for a larger index of refraction. For an increase in the index of refraction, the angle to the normal, at which the beam reflected from the mirror strikes the fluid surface 18 is increased, and consequently, the angle to the normal, at which the beam emerges from the fluid, is increased. Hence, an increase in the index of refraction results in a decrease in the difference between the actual angle at which the beam strikes the fluid and the limiting angle of total reflection.

On the other hand, the limiting angle of total reflection is given by the relation $$\sin r = \frac{1}{n}$$

wherein $r$ is the limiting angle and $n$ is the index of refraction. Obviously, then, as $n$ increases, the limiting angle at which total reflection takes place decreases, and hence, a further decrease in the difference between the aforementioned two angles results. The ray shown in broken lines is totally reflected by the combination of these two effects.

Again, it is to be noted that, in apparatus of this type, a ray that is refracted and not totally reflected suffers a displacement along the surface, as well as a change in inclination to the surface. These two effects combine and cause a change in illumination impinging on the photo-cell greater than it is possible to attain with apparatus of the type shown in Fig. 2 or that shown in Fig. 5.

It is well known that light reflected from the surface of a fluid is polarized by the surface. In general, with light incident on the surface of a fluid at approximately 60°, the degree of polarization varies from 89% of the incident light to 99% of the incident light, as the nature of the fluid changes.

This important phenomenon is utilized for studying the properties of fluids, and the system that I provide for applying this form of analysis is shown in Fig. 7. The apparatus illustrated in the drawings comprises essentially the elements of the apparatus shown in Fig. 1. In addition to the apparatus discussed above, a polarizing prism 87 is disposed between the photo-electric cell 21 and the reflecting surface 18 of the fluid 9. The prism 87 is preferably so adjusted that only the mirror component of the reflected light is transmitted to the cathode of the photo-cell. Thus, an indication is obtained of the extent to which the fluid polarizes the light reflected from its surface.

In Fig. 8, apparatus of a type wherein the dispersing power of fluids is utilized for detecting variations in their properties, is illustrated.

The apparatus shown in the drawings comprises a receptacle 89 substantially of U-section having disposed, at the closed end thereof, a prismatic cavity 91, through which a liquid 93 is forced by a pump 95. A collimated beam of light is transmitted through the liquid 93 and is dispersed and refracted thereby. The dispersed beam is partly cut off by a plate 96 having a slot 97, and frequencies within a certain region are transmitted to the cathode 19 of a photo-cell 21. The nature of the fluid traversing the receptacle determines the intensity of the light and the range of wave-length of the light that is transmitted through the slot 97.

In Fig. 9, a similar system is shown as applied to the determination of the characteristics of gases or vapors. In this case, the light from the source is also dispersed and refracted by the gas but the effect of dispersion is ordinarily eliminated by using monochromatic light, and the effect of refraction is utilized to study the properties of the gas.

I have found that, with one particular set-up of my improved apparatus for observing optical effects in fluids, a variation of .00004 in the refractive index of fluids can be detected. This variation corresponds to a change of 5%, by weight, of the acetone in an acetone-air mixture.

It is apparent then that apparatus of the type shown in Fig. 9, wherein the essential elements of the apparatus shown in Fig. 1 are combined with the receptacle and pump of the apparatus shown in Fig. 8, is of importance in the measurement of the properties and the content of gases.

In Figs. 10 to 14, certain results that I have obtained with my apparatus are shown graphically and tabulated.

In Fig. 10, the changes in density of solutions and the corresponding changes in concentration of solutions that can be observed with my apparatus are tabulated. A change in the dimensions of the optical system, of course, varies the sensitivity of the apparatus.

In Fig. 11, a curve is shown wherein the concentration of copper sulphate in water is plotted against the readings of a meter, such as meter 33, in the output circuit of an amplifier, such as is shown in Fig. 1, associated with a photo-cell, such as cell 21, which is, in the present case, affected by light transmitted through the solution. The effect observed arises principally from the change in the color of the solution introduced by the addition of the solid salt.

In Fig. 12, a similar curve is shown wherein the points were obtained by observing variations in the refractive index of the solution, as is indicated in the lower set of abscissa.

In Fig. 13, a curve, showing the progress of precipitation of barium sulphate from a water solution, is illustrated. The curve was taken by observing the variation in the quantity of the light scattered from the particles of solid suspended in the solution. Obviously, the most satisfactory apparatus for studying the solution from this particular standpoint is apparatus analogous to the type shown in Fig. 1, in which the aperture of the photo-cell is so disposed as not to receive specularly reflected light from the surface 18 of the fluid quantity.

In Fig. 14, the history of precipitation of a barium sulphate from a dilute sulphuric acid solution is shown. The transmitted light is utilized, in this case, as the means for exciting the photo-electric cell, i. e. the apparatus utilized in this case is similar to an equipment of the type shown in Fig. 2. Barium chloride is added at different times during the operation, and the meter in the output circuit of the amplifier is read at intervals. In this manner, the change in the light cut off by the suspended particles serves to indicate certain characteristics of the process, i. e. the degree of completion of solid-phase formation and the amount of solid in suspension.

It is to be noted that, in the different modifications of the apparatus shown in the drawings, a photo-sensitive cell is shown as the light-sensitive element. The use of other light-sensitive elements, such as selenium cells, thermopiles, etc., with the apparatus, are within the scope of my invention.

It is likewise to be observed that the tube 23 of Fig. 1 and the tube 65 of Fig. 5 are alternative forms of amplifiers and that it may be desirable to use the one or the other interchangeably, according to the particular conditions in the case of any of the embodiments above described. It may also be desirable to use high-vacuum grid-controlled tubes in place of, or ancillary to, either and such embodiments are within the scope of my invention.

Although I have shown and described certain specific embodiments of my invention, I am fully aware that many modifications thereof are possible. My invention, therefore, is not to be restricted, except insofar as is necessitated by the prior art and by the spirit of the appended claim.

I claim as my invention:

Apparatus for detecting changes in the properties of a fluid comprising a radiant source for transmitting radiant energy to said fluid, a container for said fluid having a specular surface within the fluid and means responsive to the radiations from said source transmitted through said fluid and reflected from said specular surface, for indicating changes in the properties thereof.

CHARLES A. STYER.